United States Patent [19]

Chelminski

[11] Patent Number: 4,608,675
[45] Date of Patent: Aug. 26, 1986

[54] LAND SEISMIC SOURCE METHOD AND APPARATUS

[75] Inventor: Stephen V. Chelminski, West Redding, Conn.

[73] Assignee: Bolt Technology Corporation, Norwalk, Conn.

[21] Appl. No.: 278,669

[22] Filed: Jun. 29, 1981

Related U.S. Application Data

[63] Continuation-in-part of Ser. No. 57,211, Jul. 11, 1979, abandoned.

[51] Int. Cl.$^4$ ............................................. G01V 1/04
[52] U.S. Cl. ................................. 367/189; 367/144; 181/114; 181/117; 181/401
[58] Field of Search ............... 181/113, 117, 119, 401, 181/114, 121; 367/144, 145, 189

[56] References Cited

U.S. PATENT DOCUMENTS

| | | | |
|---|---|---|---|
| 3,249,177 | 5/1966 | Chelminski | 181/119 |
| 3,276,534 | 10/1966 | Ewing et al. | 367/145 |
| 3,366,196 | 1/1968 | Kilmer | 181/117 |
| 3,379,273 | 4/1968 | Chelminski | 367/145 |
| 3,439,773 | 4/1969 | Dart et al. | 181/117 |
| 3,478,838 | 11/1969 | Kilmer | 181/118 |
| 3,516,509 | 7/1970 | Coburn et al. | 181/117 |
| 3,746,120 | 7/1973 | Kilmer | 181/117 |
| 3,779,335 | 12/1973 | Chelminski | 181/117 |
| 3,808,822 | 5/1974 | Chelminski | 181/119 |
| 3,915,257 | 10/1975 | Dunlap et al. | 181/114 |
| 3,997,021 | 12/1976 | Chelminski | 367/144 |

FOREIGN PATENT DOCUMENTS

| | | | |
|---|---|---|---|
| 596897 | 3/1978 | U.S.S.R. | 181/117 |
| 603929 | 4/1978 | U.S.S.R. | 181/117 |
| 615437 | 7/1978 | U.S.S.R. | 181/117 |
| 622023 | 8/1978 | U.S.S.R. | 181/117 |

OTHER PUBLICATIONS

Brochure, "PAR ® Air Guns," Bolt Associates, Inc. 1976, Norwalk, Conn.

Primary Examiner—Thomas H. Tarcza
Assistant Examiner—Ian J. Lobo
Attorney, Agent, or Firm—Parmelee, Bollinger & Bramblett

[57] ABSTRACT

An air gun is mounted in a reaction mass having an impulse-transmitting ground-contact plate movably mounted below the mass. This mass is in face-to-face contact with the plate over the major portion of the entire upper surface of the contact plate. Confined liquid is not employed. The air gun is charged with pressurized gas and fired, discharging the pressurized gas into the narrow horizontal interface region between reaction mass and plate. Rapid expansion of the discharged gas between mass and plate causes an intensely powerful seismic impulse to be transmitted into the earth. The air gun has a firing chamber for holding a charge of pressurized gas, a movable shuttle for suddenly discharging the pressurized gas, including upper and lower pistons with a hollow member connecting these pistons. A pedestal assembly carrying said shuttle is mounted from above to the reaction mass and extends down into the hollow shuttle member. When this air gun is fired, the lower piston moves away from a peripheral seal at the lower end of the firing chamber suddenly discharging pressurized gas from a central location radially outwardly into the narrow horizontal interface region. By suspending the pedestal assembly from above, powerful seismic waves can be generated using a relatively short shuttle stroke, and the gun can be positioned near the impulse-transmitting plate for directly discharging the pressurized gas into the interface region between plate and reaction mass.

5 Claims, 15 Drawing Figures

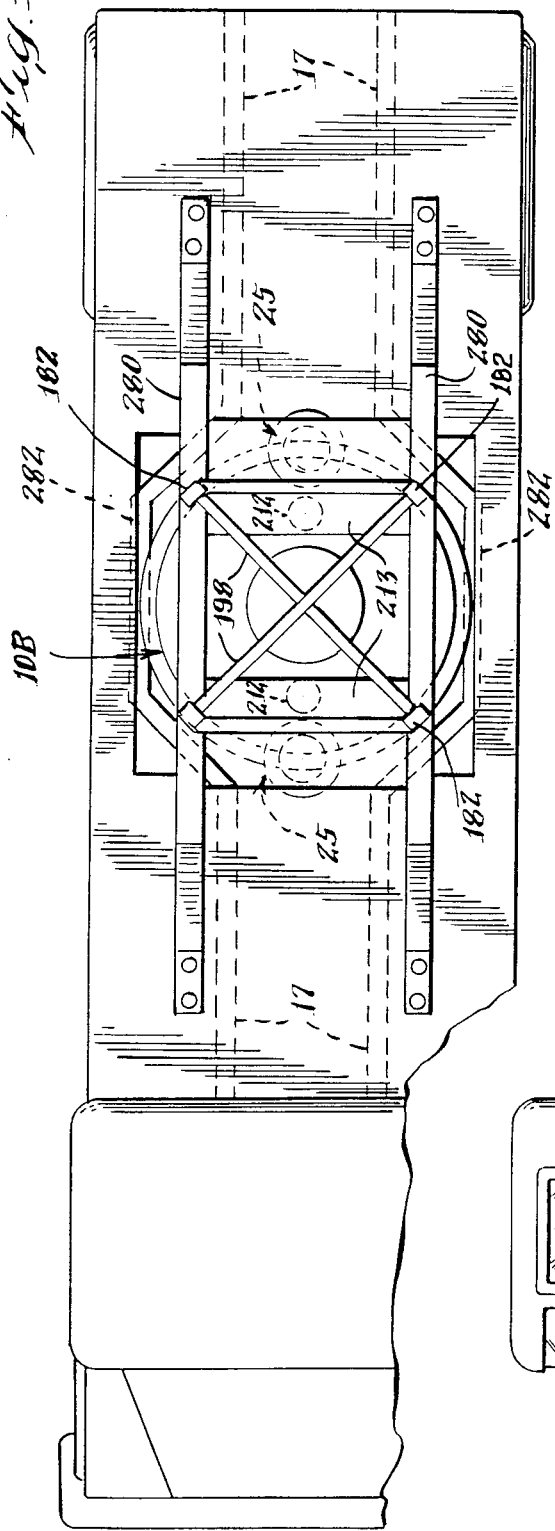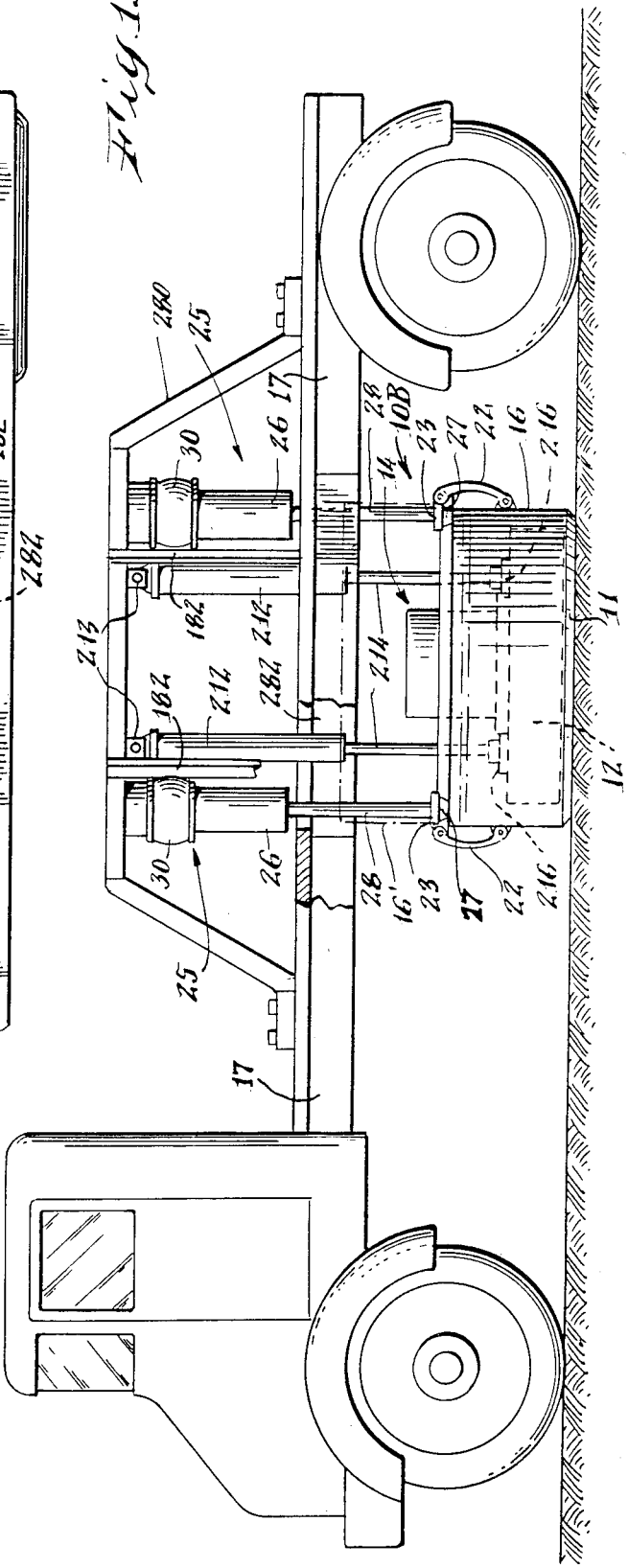

LAND SEISMIC SOURCE METHOD AND APPARATUS

RELATED APPLICATION

This application is a continuation in part of application Ser. No. 057,211, filed July 11, 1979, now abandoned.

FIELD OF THE INVENTION

This invention relates to land seismic exploration methods and systems, and more particularly to land seismic source method and apparatus for generating and transmitting powerful seismic impulses into the earth by abruptly releasing confined highly pressurized gas into a narrow horizontal interface region between two large area members, one of which is a ground contact plate, initially in impulse translating relationship with the earth and the other which is a reaction mass positioned above the plate and initially being located in face-to-face contact with the ground contact plate over the major portion of the entire area of the upper surface of the contact plate, and preferably over at least 90% of the entire area.

BACKGROUND OF THE INVENTION

In Pat. No. 3,379,273 entitled "Powerful Sound Impulse Generation Methods and Apparatus", which is assigned to the assignee of the present invention, acoustical impulse generator repeators (now usually called "air guns") are disclosed as operated with gas supplied thereto under high presssure and utilized to generate powerful seismic energy waves in a body of water such as an ocean, sea, lake, river or similar body of water. Such impulses may be conveniently repeated at frequent and accurately timed intervals from one or more air guns, which enable seismic surveys to be made of the conditions and characteristics of the bottom and sub-bottom formations beneath bodies of water. The powerful seismic impulses are adapted for transmission over long distances through the water and through the sub-bottom formations and they enable effective marine seismic surveys to be made.

In Pat. No. 3,779,335 entitled "Confined Liquid Seismic Exploration Methods and Systems", which is assigned to the assignee of the present invention, a compact mobile system is provided which enables seismic surveying and exploration to be carried out at sites having a vast range of surface conditions, for example, on hard ground, soft ground, swampy ground or submerged ground, etc. The system provides powerful seismic impulses which are generated by abruptly releasing high pressure confined gas from one or more air guns into a relatively large volume of confined liquid such as water which in turn is coupled through a diaphragm to the earth to be surveyed. In applications as a land seismic source, the system requires a water supply, and if not available on site, then the water must be transported to the survey site and be carried with the survey vehicles. Also in a freezing environment, steps must be taken to prevent the water in such a land seismic source from freezing. After the discharged gas has been released into the confined liquid, the gas must be separated from the liquid so that the confined liquid again becomes ready for the air gun to be fired. Consequently, as a practical matter, such a confined liquid land seismic source can be fired at a repetition rate no faster than once every eight seconds, and perhaps once every six seconds. Further, the gas-liquid separator is relatively large and extends upwardly giving a relatively high configuration to the confined liquid land source.

In Pat. No. 4,108,271, entitled "Seismic Land Source", which is assigned to the assignee of the present application, is shown a further seismic land source of the confined-liquid type having an outer cage-like frame.

SUMMARY

It is an object of the present invention to provide new and novel method and apparatus for generating and transmitting powerful seismic impulses into the earth suitable for seismic surveying.

A further object of this invention is to provide a land seismic source using an air gun for generating and transmitting powerful impulses into the earth which does not require the use of a confined volume of liquid for generating the seismic impulses.

Another object of this invention is to provide method and apparatus for the generation and transmission of powerful seismic impulses into the earth which are repeatable and well defined.

Still another object of this invention is to provide land seismic source method and apparatus which are convenient for use by a survey crew in all types of terrain regardless of the ready availability of water and regardless of whether the ambient temperature is above or below freezing.

By virtue of the fact that confined liquid is not employed, there is no need to spend time separating the discharged gas from the liquid prior to firing the land seismic source again. Thus, a land source embodying the present invention can be fired at a relatively rapid repetition rate, if desired, for example, once every three to four seconds.

In carrying out this invention in one illustrative embodiment thereof, a relatively compact seismic land source is provided including a housing and two large area horizontal members, one of which is a ground-contact plate adapted to be positioned down firmly against the earth in intimate impulse-transmitting relationship with the earth and the other of which is massive reaction mass positioned directly above and initially in face-to-face contact with the plate over the major portion of the entire upper surface area of the contact plate, and preferably over at least 90% of this area. An air gun is positioned in the housing and is supplied with highly pressurized gas. The air gun is fired, abruptly releasing the pressurized gas from the gun into the narrow horizontal interface between the reaction mass and the ground-contact plate for driving the plate downwardly, thereby generating and transmitting a powerful seismic impulse into the earth. The magnitude of the seismic energy impulse transmitted into the earth from this land source is substantial.

The air gun employed includes a container having a firing chamber for holding a charge of pressurized gas. A movable shuttle for suddenly discharging this pressurized gas has an upper and a lower piston with a hollow piston rod extending between the pistons, and a pedestal assembly mounted from the top of the housing on which the shuttle is positioned and movable axially. The pedestal assembly has a passageway extending therein for conducting pressurized gas to the firing chamber. The air gun is characterized by being completely sealed during the charging of pressurized gas therein, has a short stroke on firing and a rapid return to its intial closed position and can be positioned closely adjacent to the impulse-transmitting ground-contact plate for directly discharging the high pressure gas into the region between the contact plate and the reaction mass.

A compact system is provided which is convenient for mobile applications, and yet is capable of transmitting intense seismic impulses into the earth for effective seismic surveying down to relatively great depths of penetration into the earth. The resultant reflected and refracted seismic waves in the earth are sensed by suitable sensing devices or geophones which are known in the art, and in this way information is obtained down to relatively great depths about the conditions and characteristics of the geologic formations in the regions being surveyed.

Advantageously, the land seismic source method and apparatus in accordance with the present invention enable seismic land surveying in remote geographical locations and in hostile environments without the use of confined water which may not be locally available or might require steps to avoid freezing for climatic reasons.

As used herein the term "high pressure gas" or "highly pressurized gas" is intended to include any suitable compressible gaseous fluid which may be utilized in an air gun and having a pressure above approximately 1,000 pounds per square inch (p.s.i.) for example such as compressed air, compressed nitrogen, compressed carbon dioxide, pressurized steam, pressurized gaseous products of combustion, and mixtures thereof, and so forth. The most convenient and readily available high pressure gas is compressed air. However, in the event that conditions at the site should dictate the avoidance of compressed air, or if other ressons dictate against using compressed air, then another suitable compressible gaseous fluid as described may be utilized.

BRIEF DESCRIPTION OF THE DRAWINGS

The invention, together with further features, objects, aspects and advantages thereof, will be better understood from a consideration of the following detailed description in conjunction with the accompanying drawings showing the best mode currently known to the present inventor for putting this invention into practice, together with alternative arrangements for mounting onto the chassis of a vehicle.

The drawings are not necessarily drawn to scale, emphasis instead being placed upon illustrating the principles of the invention.

FIG. 10 also shows portions of the ground contact plate and reaction mass in initial face-to-face contact.

FIG. 14 is a top plan view of a vehicle carrying a land seismic source embodying the present invention in an alternative mounting arrangement.

FIG. 15 is a side elevational view of the vehicle and land seismic source of FIG. 14.

DESCRIPTION OF THE PREFERRED EMBODIMENTS

In the description which follows like elements will be designated with the same reference numbers throughout the various FIGURES.

Figure 1:
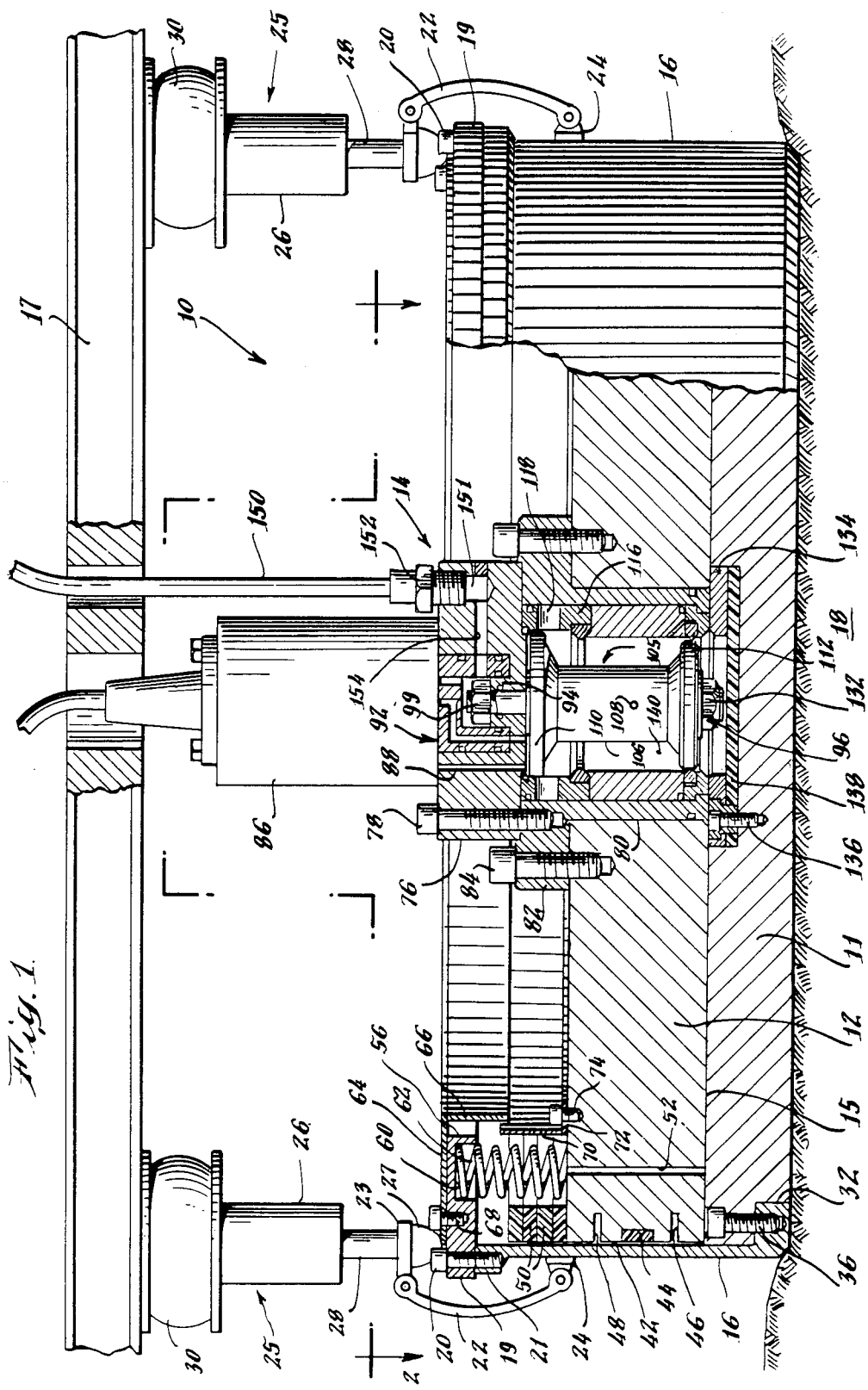
FIG. 1 is a front elevational view, partly in section, illustrating land seismic source method and apparatus embodying the present invention.
Figure 2:
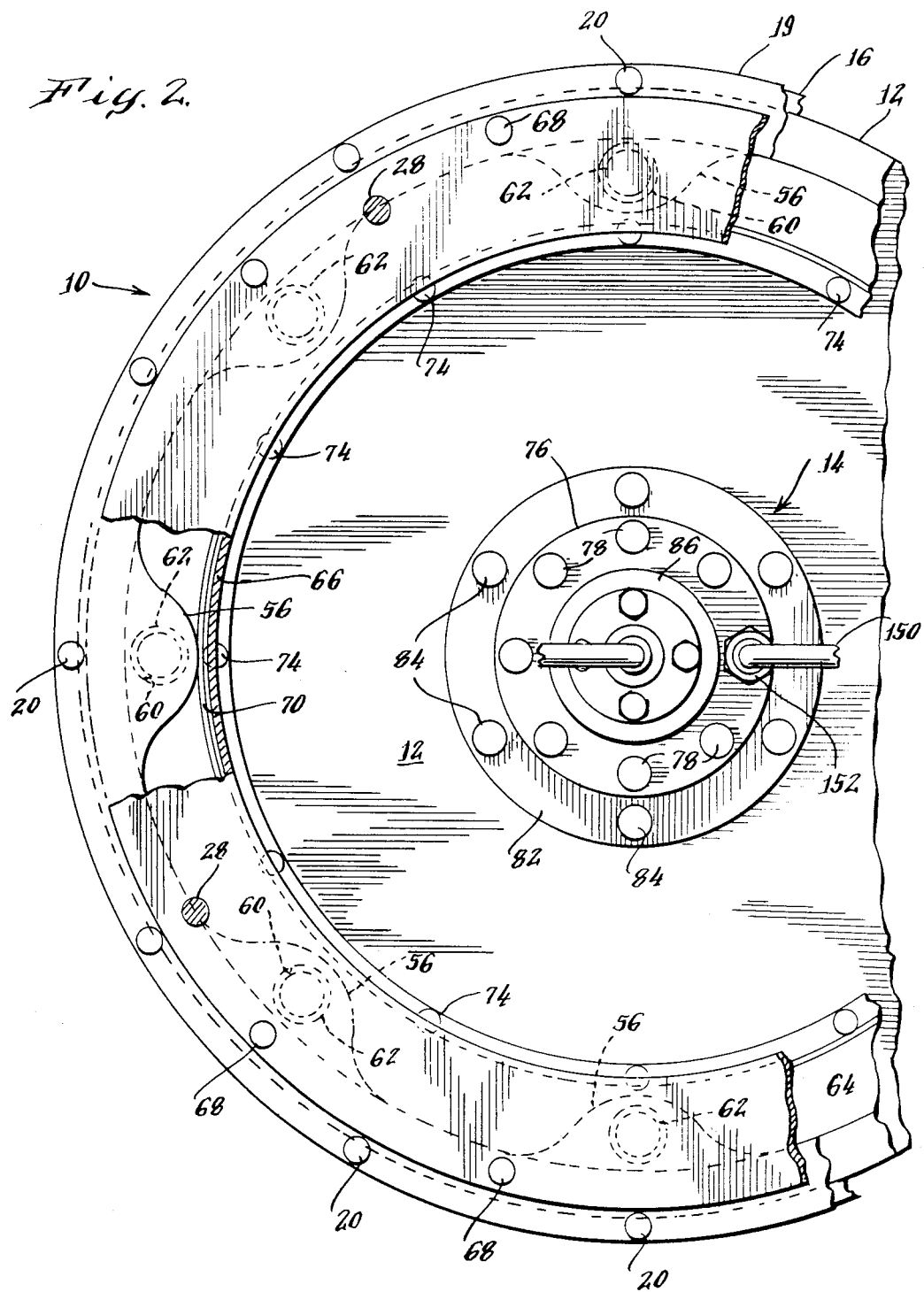
FIG. 2 is a top plan view taken along lines 2—2 of FIG. 1 with parts shown broken away.

Referring now to FIGS. 1 and 2, a land seismic source, referred to generally with the reference number 10, is characterized by providing a compact overall system which is convenient for mobile applications in which the source 10 is mounted on a land vehicle. When in position at the exploration site, circular impulse-transmitting plate 11 in the source 10, is pressed firmly down against the earth or ground 18. Immediately above this ground contact plate 11, there is a reaction mass 12, and an air gun 14 is positioned for suddenly discharging high pressure gas into the narrow horizontal interface region 15 between the contact plate and reaction mass 11 and 12 for generating and transmitting a powerful seismic impulse into the earth 18, as will be explained in detail further below.

The land seismic source 10 includes a movable outer guide cylinder or housing 16. When the seismic land source 10 is on location in impulse-transmitting relationship with the earth or ground 18 as shown in FIG. 1, the source 10 is resiliently mounted by a plurality of shock-absorbing assemblies 25 to the chassis, frame or support structure 17 of its carrier or land vehicle.

Each of the resilient shock-absorbing assemblies 25 includes an air bag 30, a hydraulic cylinder and piston assembly 26 having an operating piston rod 28 with a resilient bumper 27 attached to the lower end of the piston rod for exerting a downward thrust onto the outer guide cylinder 16 which in turn is connected to the perimeter of the plate 11, which is shown as a rigid metal plate. This bumper 27 is shown pressing down upon a strong horizontal ring 19 which is attached to the top of the movable outer guide cylinder 16 by means of a ring of bolts 20 threaded into sockets in a flange 21 on the movable guide cylinder 16. Thus, the plurality of hydraulic cylinder and piston assemblies 26 can be operated to push the bumpers 27 forcefully downwardly to apply the weight of the vehicle onto the contact plate 11 for pressing this plate down firmly against the earth before the air gun 14 is fired. The air bags 30 tend to isolate the chassis or frame 17 from mechanical shock when the land source 10 is fired.

In order to transport the land source from one survey site to the next site, in other words from one "shot point" to the next shot point, carrying means are provided for lifting the whole land source 10 up from the earth, so that it is supported from the chassis or frame 17. This carrying means includes a strong, tough resilient strap 22, for example of Nylon woven belt material, or tough solid, molded polyurethane connected to a mounting 23 at the lower end of the piston rod 28 and also connected to a mounting 24 on the outside of the movable guide cylinder. When it is desired to elevate the land source 10 to transport it to the next shot point, the hydraulic cylinder and piston assemblies 26 are operated to retract their piston rods upwardly. The straps 22 then serve to lift the guide cylinder 16 and contact plate 11, thereby lifting the entire source 10 clear of the ground, so that it is supported from the chassis or frame 17 ready to be moved to the next shot point.

The shock-absorbing mounting assemblies 25 are spaced about the top of the land source 10 and may comprise two to four such assemblies as desired depending upon the particular vehicle frame or chassis arrangement.

As discussed above, the purpose of the seismic land source 10 is to transmit powerful seismic impulses into the earth. The components primarily involved in this method include the ground contact plate 11 and reaction mass 12 with the narrow horizontal interface region 15 between them into which a large quantity of high pressure gas is abruptly discharged by the air gun 14. The contact plate 11 serves as the seismic impulse transmitting member and is mounted by machine screws 36 on an inwardly extending annular flange 32 on the outer guide cylinder 16. It is essentially held down in impulse-transmitting relationship with the earth or ground 18, as discussed above. In this embodiment, the contact plate 11 is shown as a rigid metal plate made from a tough, durable, structurally strong material, for example, from steel or a strong aluminum alloy. The reaction mass 12 is characterized by being massive, rigid and circular, as shown in plan view, and it is made of a suitable metal, for example, such as steel.

This reaction mass is positioned within said outer guide cylinder 16 and carries a bearing sleeve insert 44, and upper and lower piston rings 48 and 46, respectively. The bearing sleeve 44 and the piston rings 46 and 48 are carried in grooves encircling the reaction mass 12. The bearing 44 is preferably positioned in the central horizontal plane of the reaction mass 12; that is, midway between the top and bottom surface of this mass 12, and the piston rings 46 and 48 are preferably equally spaced from this bearing. There is circumferential clearance space 42 around the reaction mass 12 above and below the bearing 44 for preventing any wedging or jamming of the guide cylinder 16 against the perimeter of the reaction mass 12 in the event that the contact plate 11 might tend to tilt or cock. Such tendency of the contact plate 11 could occur if the earth 18 on the left side of FIG. 1 is considerably denser or firmer than the earth on the right side. In such a case, during transmission of a seismic impulse, the plate 11 would tend to move more into the earth on the right side than on the left, producing a tendency for the guide cylinder 16 to tilt or cock slightly with respect to the perimeter of the reaction mass 12. The mid-plane bearing 44 and the clearance 42 above and below this bearing plus the piston rings 46 and 48 allow such slight tilt to occur, thereby preventing the wedging of the guide cylinder 16 about the mass 12, so that it may freely return to its initial position in order to ready the seismic land source 10 for the next firing, generation and transmission of powerful impulse into the earth.

In their initial positions, as shown in FIG. 1, the reaction mass 12 is in face-to-face contact with the ground contact plate 11 over 93% of the upper surface area of this plate.

Figure 3:
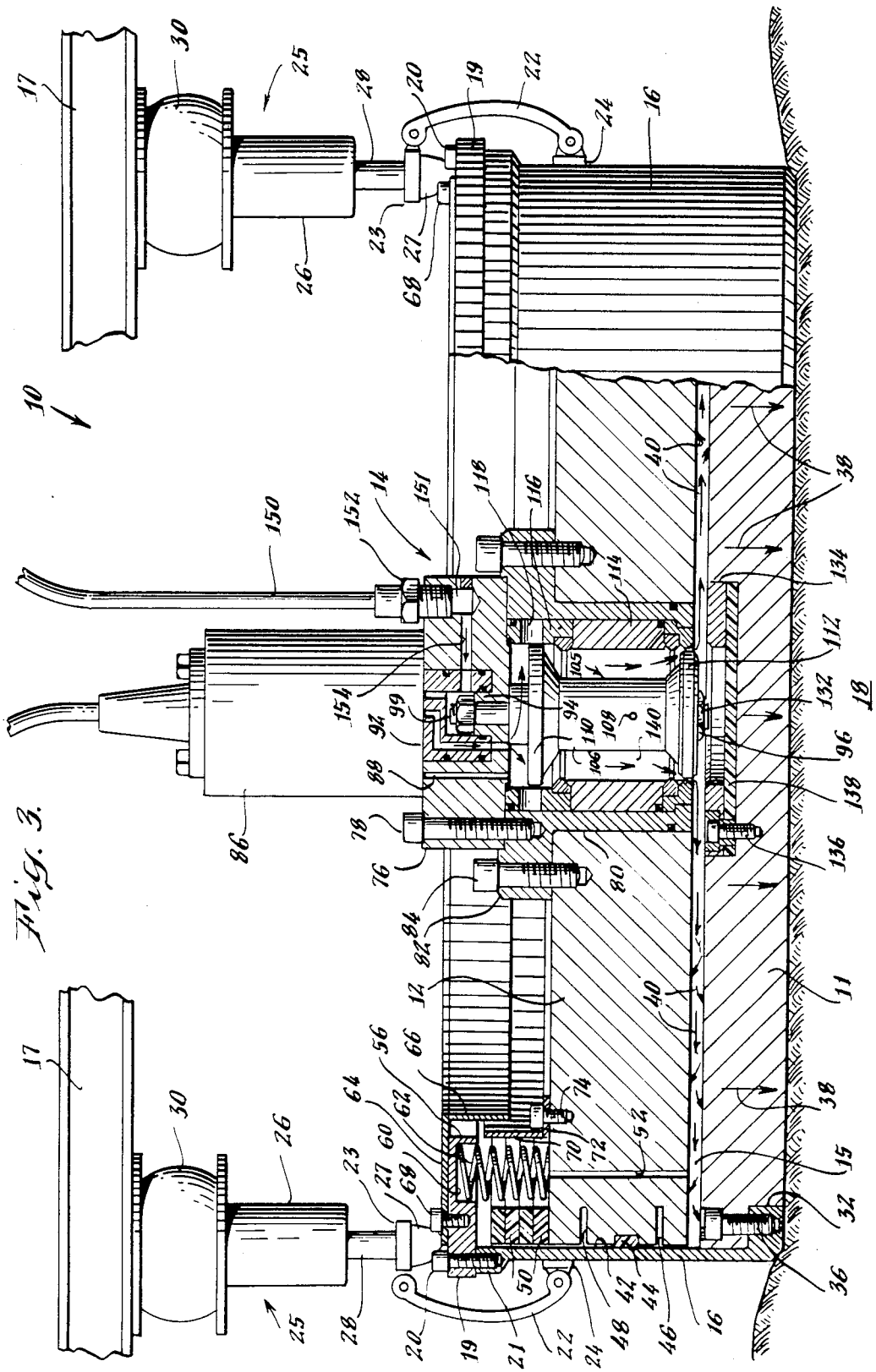
FIG. 3 is a view similar to FIG. 1 illustrating the relative positions of the parts immediately after discharge of the high pressure gas into the essentially no volume region between the ground plate and the reaction mass.

As shown in FIG. 3, when the air gun 14 is fired, the high pressure gas 40 is suddenly discharged into the narrow horizontal interface region 15 between the mass 12 and plate 11. This discharge gas 40 abruptly expands in this narrow region 15 thereby exerting a powerful, sudden downward thrust 38 on the whole upper surface area of the contact plate 11. FIG. 3 shows that the contact plate 11 has been driven downwardly somewhat farther into the earth 18 as compared with its position in FIG. 1.

Figure 4:
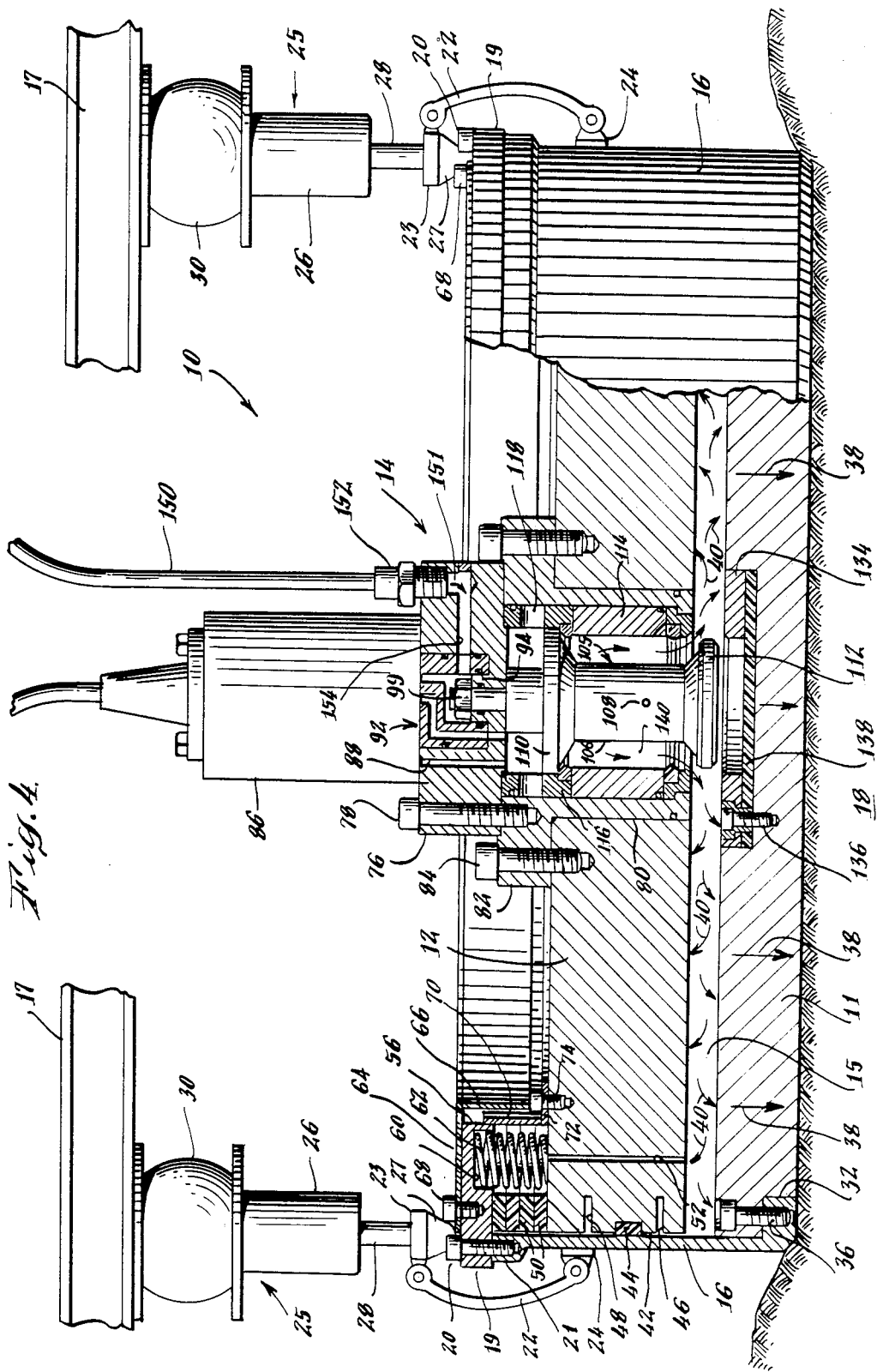
FIG. 4 is a view similar to FIGS. 1 and 3 illustrating the relative positions of the parts when they have fully moved after firing to the limits of their travel.

FIG. 4 shows the completion of the downward stroke of the contact plate as driven by the expanding gas 40 in the region 15. The shock-absorbing bumper 50, in FIG. 4, is shown abutting against the underside of the strong horizontal ring 19 which serves as a stop for limiting the travel of the reaction mass 12 relative to the guide cylinder 16 and plate 11. These bumper pads are a plurality of rings of tough resilient material, for example, of polyurethane, stacked on top of each other and resting in top of the reaction mass 12. In this example the bumper 50 and stop 19 engage after a relative travel of one-half inch between the reaction mass 12 and plate 11. In other words, the plate 11 becomes separated approximately one-half inch from the reaction mass 12 at the limit of its stroke.

In order to allow the expanded gas to escape from between the plate 11 and mass 12, there is a small diameter vent passage 52 extending upwardly through the reaction plate 12 near its perimeter. This vent or bleed passage 52 is sufficiently long and sufficiently small in diameter that an insignificant amount of gas 40 can escape through it during the discharge and expansion stroke as shown in FIGS. 3 and 4.

There are a plurality of springs 62 which urge the plate 11 and mass 12 back toward each other. The upper end of each spring 62 seats up in a socket 60 in the stop ring 19. As shown in FIG. 2, the stop ring 19 has a plurality of inwardly extending ledge portions 56 each of which contains one of the sockets 60 for the respective springs 62.

As previously indicated, the impulses transmitted into the earth by the seismic land source 10 are substantial. The shock-absorbing mounting assemblies 25 including the air bags 30 protect the frame or chassis 17.

As illustrated in FIG. 2, a plurality of springs 62 are provided, one in each socket 60 equally spaced around the stop ring 19 and accordingly around the perimeter of the reaction plate 12.

The travel stop ring 19 is mounted to a shoulder 21 on the outer guide cylinder 16 by screws 20. An annular cover ring 64 is secured to the travel stop ring 19 by screws 68. The annular cover ring 64 has a downwardly extending barrier 66 which overlaps in cooperation with annular protective barrier 70 to prevent the entry of foreign matter into the seismic source 10. The annular protective barrier 70 has a lower flange 72 which is attached by screws 74 to the reaction mass 12.

In order for the seismic land source 10 to generate powerful impulses in the earth, the air gun referred to generally with the reference character 14, must suddenly release a large quantity of high pressure gas abruptly into the initial face-to-face contact region 15 an initial region essentially of zero initial volume) between the plate 11 and the reaction mass 12. A suitable source of high pressure gas, such as compressed air, may be utilized and because of this use of compressed air, the gas-discharging gun 14 is commonly referred to as an air gun. However, other forms of compressed gas may be utilized as discussed above in the introduction.

It is important that the interface region 15 initially contain an insignificant volume relative to the volume of the pressurized gas initially contained in the firing chamber of the air gun, because this highly pressurized gas (compressed air) from the firing chamber is suddenly released into this interface region. Since this interface region 15 contains insignificant initial volume, not much expansion of the pressurized gas occurs as this gas suddenly rushes from the firing chamber into the region 15. Therefore, the entire upper surface area of the ground contact plate 11 becomes suddenly exposed to a high pressure gas for applying a powerful very sudden downward thrust over the entire upper surface of the plate 11 for generating and transmitting a powerful seismic impulse into the earth 18.

In view of the above paragraph, it will be understood why the reaction mass is desired to be in face-to-face contact with a major portion of the entire upper surface of the ground contact plate and preferably to contact at least 90% of this area; that is, in order to minimize the initial volume of the interface region 15 for maximizing the pressure available as the pressurized gas rushes from the air gun firing chamber into this interface region immediately adjacent to the upper surface of the ground contact plate 11.

Figure 5:
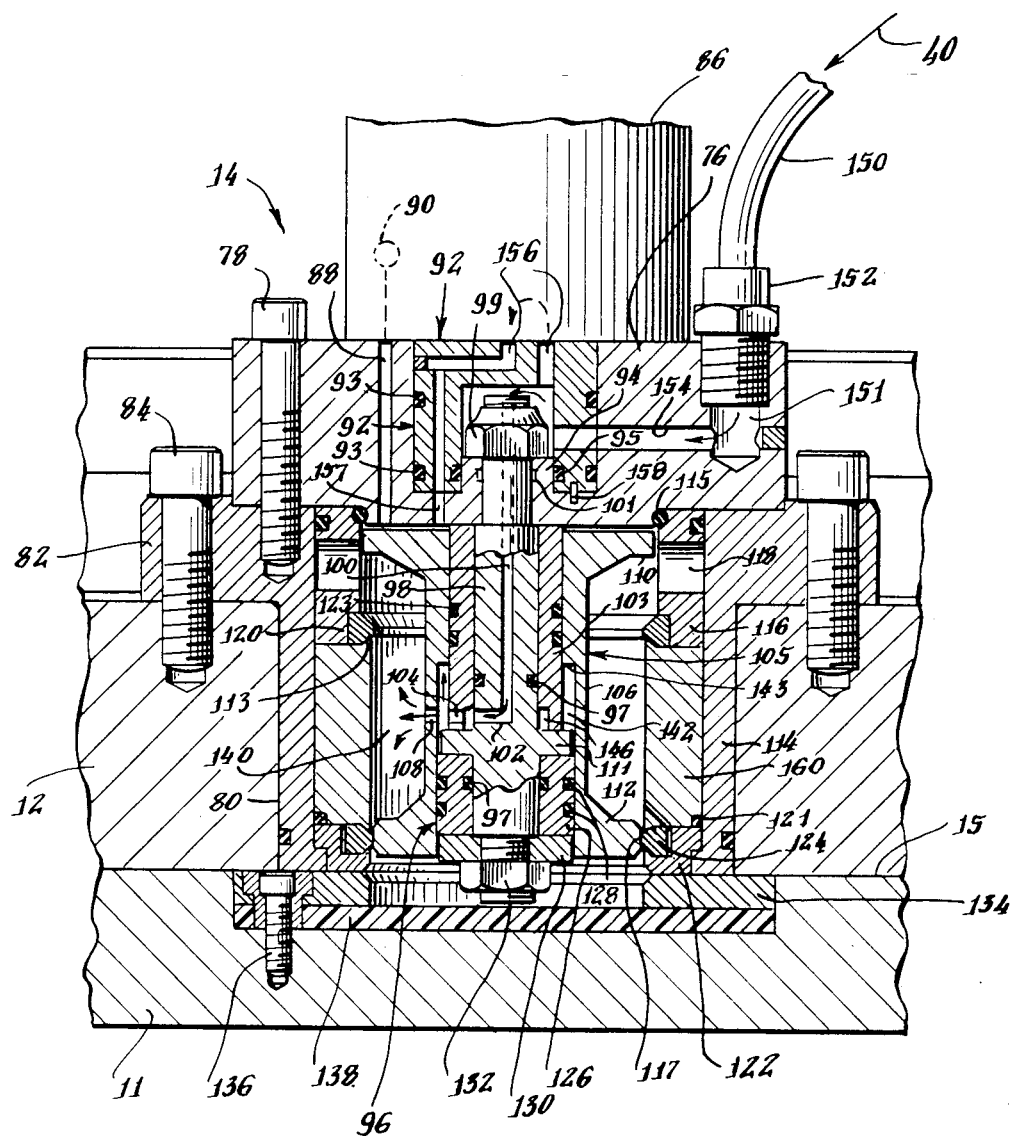
FIG. 5 is an enlarged axial-sectional view of the air gun with its shuttle in the initial closed position as shown in FIG. 1 illustrating the charging of the gun with pressurized gas.

As seen best in FIG. 5, the air gun 14 includes a cylindrical housing or container 80 having an upper flange 82 which is secured to the reaction mass plate 12 by screws 84. A cylindrical end wall 76 which carries a solenoid valve 86 is mounted on the upper flange 82 by screws 78. A monitor passage 88 extends through the cylinder end wall 76 to a fluid pressure sensor transducer 90 in the housing of the soleniod valve 86 for monitoring the actual instant of firing of the air gun 14.

A trigger passage and fill passage assembly 92 is mounted centrally in the cylinder end wall 76 with O-ring seals 93 to provide an air tight seal therebetween. A seal collar 94 is positioned in the bottom of this assembly 92 and is surrounded by an O-ring seal 95 again for providing a sealing engagement between the elements. This passage assembly 92 along with the solenoid valve 86 functions to trigger the firing of the air gun, and its operation will be explained in more detail hereinafter.

The purpose of the air gun 14 is to hold pressurized gas therein under high pressure and suddenly to discharge the charge of gas in a very brief period of time in response to triggering control by the solenoid valve 86. To carry out this function the cylindrical container 80 holds an upper cylinder wall sleeve 116 and an abutting sleeve 114 which surround a firing chamber 140 in the container 80. A pedestal assembly 96 having a shank member 98 is mounted on the cylinder end wall 76 by a nut 99 separated from the cylinder end wall by the seal collar 94. An O-ring seal 101 is provided between the shank member 98 of the pedestal assembly and the seal collar 94.

The shank member 98 carries a shaft gland sleeve 103 thereon which extends downwardly to rest upon a flange 111 on the shank member. A retainer washer 130 is held up against the end of the shank member 98 by a nut 132 which is screwed into the threaded lower end of the shank member 98. Another shaft gland 126 is positioned around the shank member 98 of the pedestal assembly 96 between the flange 111 and the washer retainer 130. O-ring seals 97 are provided between the shank member 98 and the gland sleeve 103 and shaft gland 126 to insure proper sealing engagement between these members.

The pedestal assembly 96 provides a means for charging the firing chamber 140 with pressurized gas as well as a bearing or guide on which a movable shuttle 105 can move in the firing chamber in a manner which will now be described.

As shown in FIG. 5, the shuttle 105 includes a hollow piston cylinder 106 which interconnects an upper piston 110 and a lower piston 112. The upper piston 110 is rigidly coupled by the piston cylinder 106 to the lower piston 112 so that they are capable of movement with very great acceleration over a predetermined stroke on the pedestal assembly 96 before suddenly discharging the high pressure gas from the firing chamber into the region 15 between the plate 11 and mass 12. The lower piston 112 serves as an opening and closing means for containing and then releasing the high pressure gas in the firing chamber 140, while the upper piston serves as an operating means for the lower piston for holding it closed and then releasing it in response to action of the solenoid valve 86 so that the pistons move with great acceleration to discharge the high pressure gas from the firing chamber into the interface region 15.

In order to provide a closed position for the firing chamber 140, a retainer ring 122 is mounted at the lower end of the container 80 below the sleeve 114 with an O-ring seal 121 positioned therebetween. This retainer 122 holds a peripheral seal 124 which contacts the rim of the lower piston 112 when the shuttle 105 is in its initial closed position before the gun 14 is fired. A resilient cushion stop ring 120 is mounted in an internal groove in the lower end of the cylinder wall sleeve 116 being retained by a sloping lip 113 on the sleeve 114. This stop ring 120 captivates the shuttle in the firing chamber 140 by restricting movement of the upper piston 110 in the firing chamber 140. It should be noted that the diameter of the upper piston 110 is slightly larger than the diameter of the lower piston 112 and that the resilient cushion stop 120 along with the sleeve 114 which has a smaller internal diameter than the sleeve 116 limit the movement of the larger diameter upper piston 110 in the firing chamber 140.

In mounting the shuttle 105 on the pedestal assembly 96 it is important to provide sealing engagement between the elements, and accordingly O-ring seals 123 are provided between the sleeve 103 and the bore of the movable shuttle 105, and O-ring seals 128 are provided between the shaft gland 126 and the larger diameter bore in the lower end of the shuttle.

With the shuttle 105 in the closed position, the lower end of the pedestal assembly 96 projects downwardly into a recess 135 in the ground contact plate 11 defined by a resilient bumper pad 138 mounted in the plate 11 by a retainer ring 134 which is secured to the plate 11 by screws 136.

In order to fill the firing chamber 140 with pressurized gas, a source of pressurized gas such as compressed air above 1,000 pounds per square inch is fed through a high pressure supply hose line 150 to a high pressure supply inlet 151 in the cylinder end wall 76 and secured therein by a fitting 152. A filler supply passage 154 conducts the pressurized gas to an axial passage 100 in the shank member 98 of the pedestal assembly 96. A radial bore 102 communicating with this axial bore 100 in the shank member 98 feeds the pressurized gas to an annular connector passage 146 in gland sleeve 103 communicating with a supply port 104 in the gland sleeve which feed the pressurized gas into an annular shuttle return chamber 142 and then through a supply orifice 108 in the piston cylinder 106 leading into the firing chamber 140.

The arrow 144 projecting upwardly in the annular shuttle return chamber 142 illustrates the return thrust by which the gas being fed into the firing chamber also serves to return the shuttle 105 to its initial closed positioned after firing. The reason for having a larger diameter bore in the lower portion of the shuttle encircling the gland 126 a compared with the smaller bore in the upper portion of the shuttle encircling the gland 103 is to provide an internal shoulder 143 at the upper end of the return chamber 142. The pressurized gas in the return chamber 142 exerts its upward thrust 144 on its internal shoulder 143. The supply orifice 108 is sufficiently small as compared with the supply passages 100 and 102 for assuring that the pressure in the return chamber 142 is sufficient for fully returning the shuttle to its closed position before the firing chamber 140 is recharged with pressurized gas. In its closed position the rim of the upper piston 110 is in sealing engagement with a seal ring 115. The directions of the flow arrows in FIG. 5 show the flow of the pressurized gas 40 through the supply line 150, through passage 154, through the passage assembly 92 into the axial bore 100, through the radial bore 102, the annular connector passage 146 and supply port 104 feeding into the annular shuttle return chamber 142 and then through the orifice 108 into the firing chamber 140.

In order to fire the air gun 14 trigger passages 156 are provided in the assembly 92 which extend from the fill passage 154 into the soleniod valve and from the solenoid valve down through a passage 157 in the cylinder end wall 76 to the top of the upper piston 110. When the solenoid valve 86 is actuated, pressurized gas is applied through the firing passages 156 of the assembly 92 to the top of piston 110 driving the shuttle 105 down axially in the firing chamber 140, suddenly separating the lower piston 112 from the peripheral seal 124 and thereby abruptly releasing pressurized gas into the region 15 between the plate 11 and mass 12. An alignment pin 158 is provided between the cylinder end wall 76 and the assembly 92 in order to properly align the pressurized gas passages in the assembly with the fill passage 154 and trigger passage 157. A pressure applying passage 160 is provided communicating with the outer surface of the peripheral seal 124 to urge this peripheral seal 124 so as to hold this seal firmly in engagement within the perimeter of the lower piston 112 when the shuttle is in its closed position.

This peripheral seal ring 124 has a ridge 117 facing radially inwardly toward the periphery of the lower piston 112 with two converging surfaces sloping inwardly toward the ridge. Thus, the base of this seal ring which faces radially outwardly has a much larger area than the inwardly protruding ridge. The pressurized gas communicates through the passage 160 with the base of the seal ring 124 thereby urging this seal into firm engagement with the periphery of the lower piston 112, as disclosed and claimed in Pat. No. 4,271,924. The seal ring 124 is held by a lip on the sleeve 114 which overlaps the upper sloping surface of the seal ring near its ridge 117. Similarly, a lip on the retainer 122 overlaps the lower sloping surface of the seal ring 124 near its ridge 117. This seal ring has a five-sided annular configuration with the ridge 117 at the apex of the two sloping sides.

Summarizing the operation of the seismic land source 10 in accordance with the present invention, the source 10 is transported to the survey site and positioned on the earth or ground 18 where the survey is to be made. A supply of pressurized gas 40 is fed to the gun 14 for charging the firing chamber 140, as best illustrated in FIG. 5. FIG. 1 also illustrates the shuttle 105 of the pressurized gas gun 14 in its initial closed position on the pedestal assembly 96 in the firing chamber 140.

As is best seen in FIG. 3, the gun 14 is fired by actuating the solenoid valve 86 which directs pressurized gas from the fill passage 154 through the assembly 92 into the region on top of the upper piston 110 thereby forcing the shuttle 105 downwardly in the firing chamber breaking away from the upper seal 115, and breaking away from the lower peripheral seal 124 and suddenly discharging the pressurized gas into the region 15 between the massive reaction mass 12 and the plate 11, which are initially resting in face-to-face contact.

FIG. 4 illustrates the shuttle 105 at the bottom of its descent in the firing chamber 140 with the upper piston 110 resting against the resilient cushion stop ring 120. It is the bumper pad 138 which initially stops further descent of the shuttle 105 in the firing chamber 140. As seen in FIG. 4, the greatest separation is occurring between the reaction mass 12 and the plate 11 driving the plate downwardly against the ground or earth and transmitting therein a powerful seismic impulse. Any upward movement of the reaction mass 12 is damped by the shock pads 50 and the springs 62. The damping actions on the reaction mass 12 by the shock pads 50 and the springs 62, as well as the shock absorption of the shock-absorbing mounting assemblies 25 return the source 10 to its initial condition ready for the next firing sequence. The bleed passage 52 allows the expanded gas in region 15 to escape in a controlled manner. Another escape path is also provided around the piston rings 46 and 48 around the perimeter of the reaction mass 12. A relatively rapid firing repetition rate of once every three to four seconds may be utilized, if desired.

Thus shuttle 105 of the gun 75 has a relatively short stroke of approximatley $\frac{3}{8}$ to $\frac{5}{8}''$. To enhance the shuttle acceleration, the cylinder wall sleeve 116 encircling the top of the firing chamber 140 includes a plurality of by-pass openings 118 in the wall 116. On firing, the pressurized gas is supplied to the top of the piston 110 forcing it downwardly into communication with the by-pass openings 118 which allow pressurized gas to equalize in pressure above and beneath the piston 110 thereby increasing downward shuttle acceleration. The perimeter of the lower piston 112 includes a vertical cylindrical surface in sliding engagement with the ridge 117 of the peripheral seal 124. Thus, as soon as the upper piston 110 moves away from its seal 115, there is a forceful downward thurst of the confined gas in the firing chamber 140 acting down on the lower piston while its perimeter is sliding down past the seal 124. Also, the cylindrical inner surface of the retainer 122 near its lip which overlaps the seal ring 124 is close to the perimeter of the downwardly moving piston 112 thereby extending the acceleration distance along which the perimeter of the piston 112 moves before the pressurized gas is suddenly discharged from the chamber 140 into the interface region 15. Consequently, there is a very sudden discharge action because the shuttle 105 is moving rapidly downwardly before the lower piston fully separates from the seal 124 and retainer 122.

Figure 6:
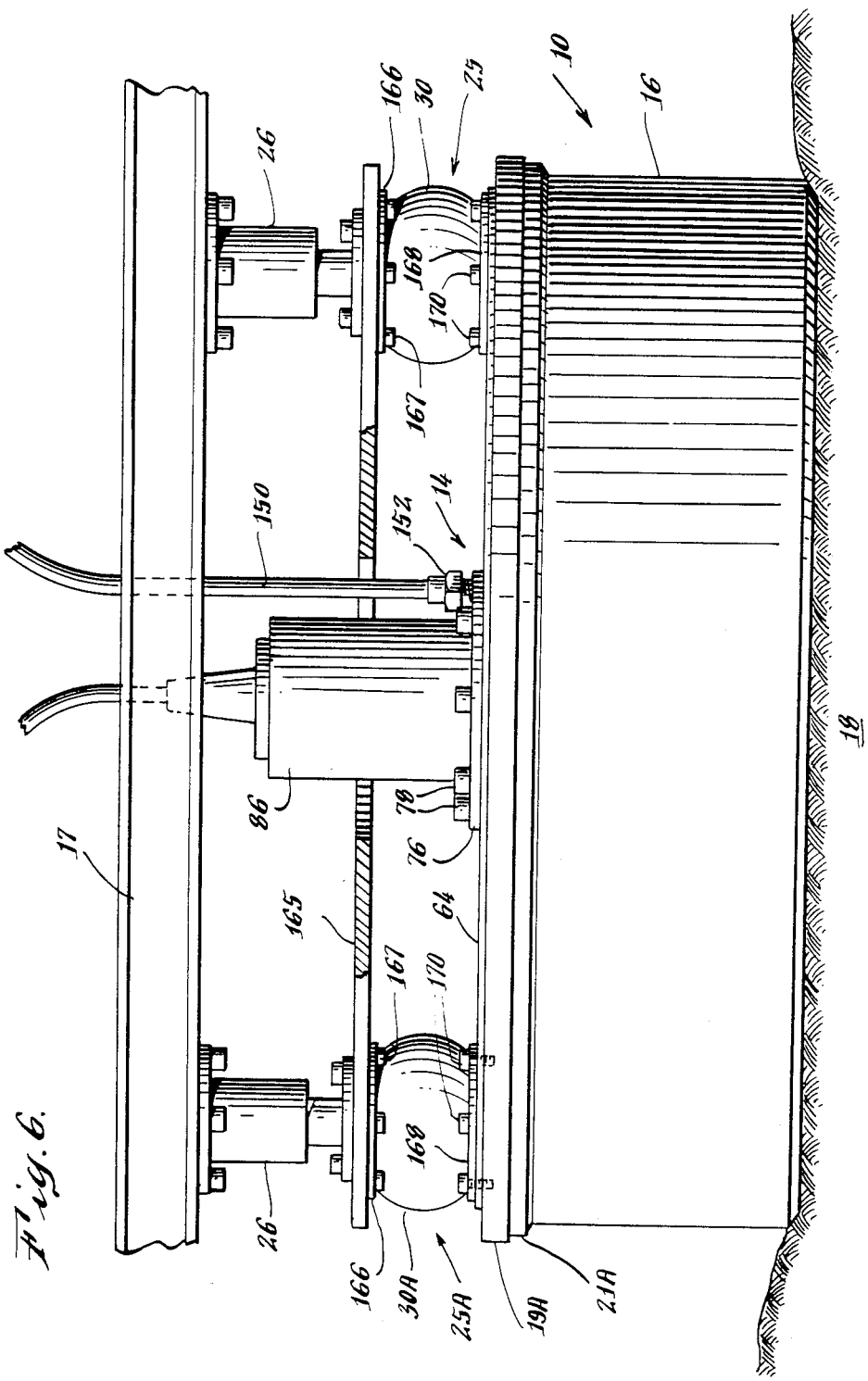
FIG. 6 illustrates an alternative mounting arrangement for the land seismic source.

FIG. 6 illustrates another embodiment of a shock-absorbing mounting means 25A in the form of air bags 30A. These air bags 30A have an upper plate 166 which is mounted on a movable platform 165 by bolts 167 and a lower plate 168 which is mounted by screws 170 on the annular cover ring 64 of the seismic land source 10. The air bags 30A may have an inner tube configuration with re-enforcing ribs. These bags 30A may be in the form of a bellows with re-enforcing ribs. The internal pressure in the bags may be varied in accordance with the operating requirements of the system. The platform 165 can be raised and lowered by a plurality of hydraulic cylinder and piston assemblies which are mounted onto the chassis or frame of the vehicle. These cylinder and piston assemblies are similar in action to those shown at 26 in FIGS. 1, 3 and 4. They serve to exert a downward force on the platform 165 for pressing the contact plate 11 firmly against the earth before the seismic source 10 is fired. They serve to elevate the source 10 for transport to the next shot point.

It should be appreciated that only a single source of pressurized gas is required for the operation of the air gun in accordance with the present invention. Furthermore, the incoming flow of pressurized gas through the pedestal into the return chamber serves to automatically restore the shuttle to its initial position after firing. Therefore, the air gun is automatically conditioned for repeated firing without requiring additional sources of additional structure.

Although the dimensions of the land seismic source of the present invention will depend on the requirements of a particular application, the contact plate 11 may have, for example, a diameter in the range of 1½ to 7 feet. Depending upon the compressibility of the earth 18 at the survey site, changes in the thickness and rigidity of this plate will affect the frequency components of the powerful seismic impulse being transmitted into the earth and may be used to optimize the transmitted signal for the survey conditions being encountered.

Figure 7:
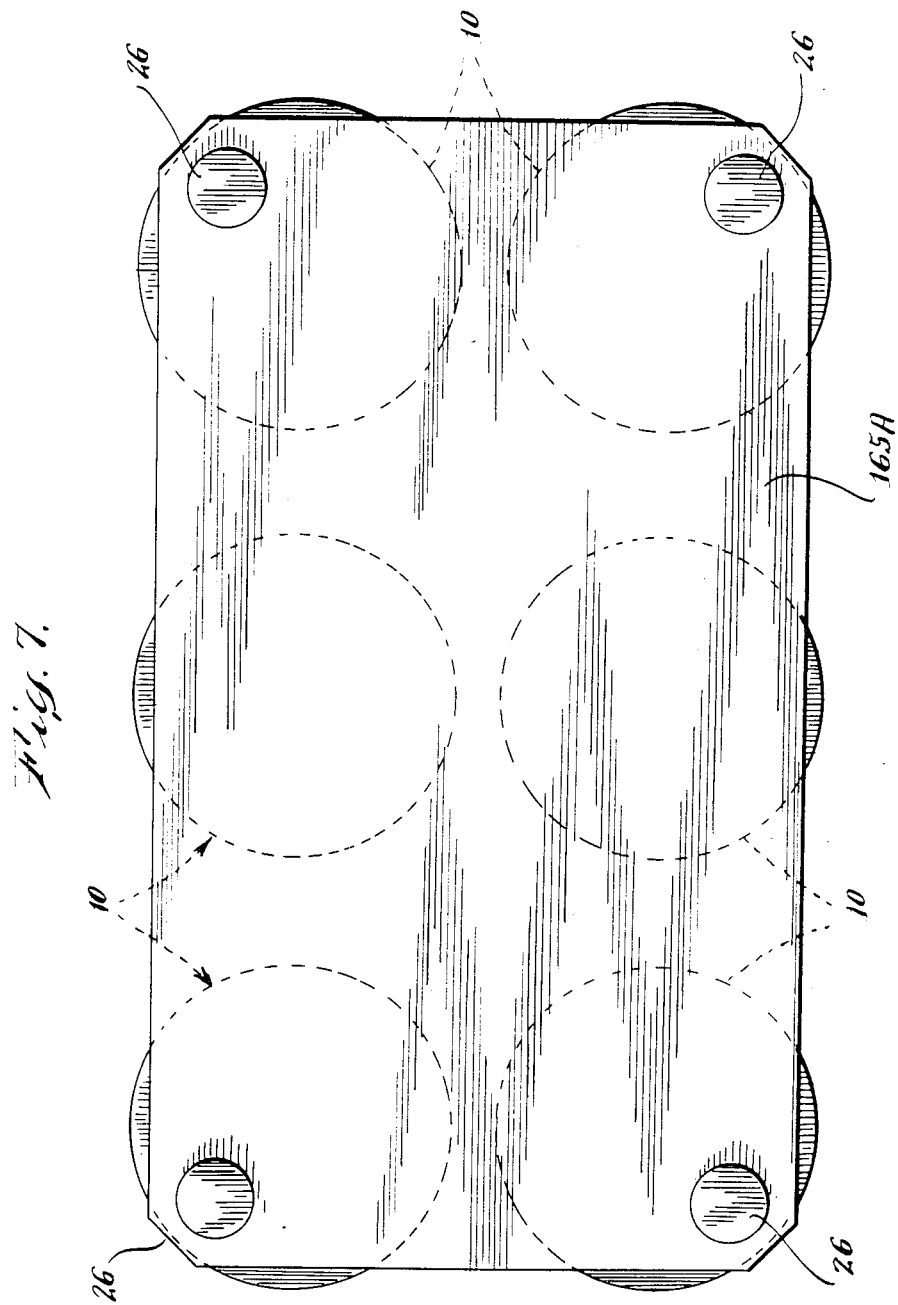
FIG. 7 illustrates in plan view the mounting of six land seismic sources on one vehicle adapted to be used as an array.
Figure 8:
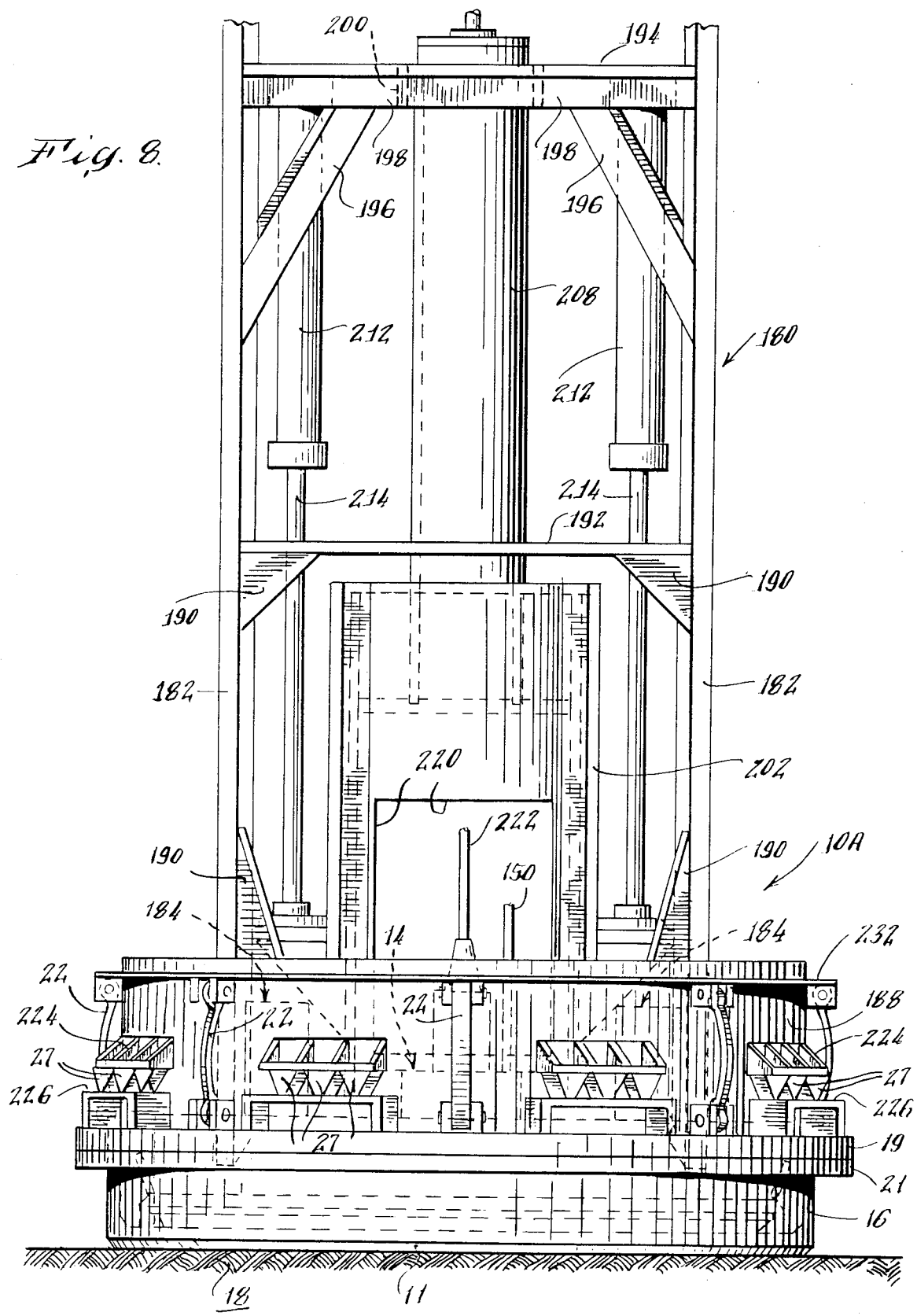
FIG. 8 is an elevational view of another embodiment of the land source of the present invention installed as a retrofit into a cage-like frame, such as shown in U.S. Pat. No. 4,108,271 to which reference is made above.
Figure 9:
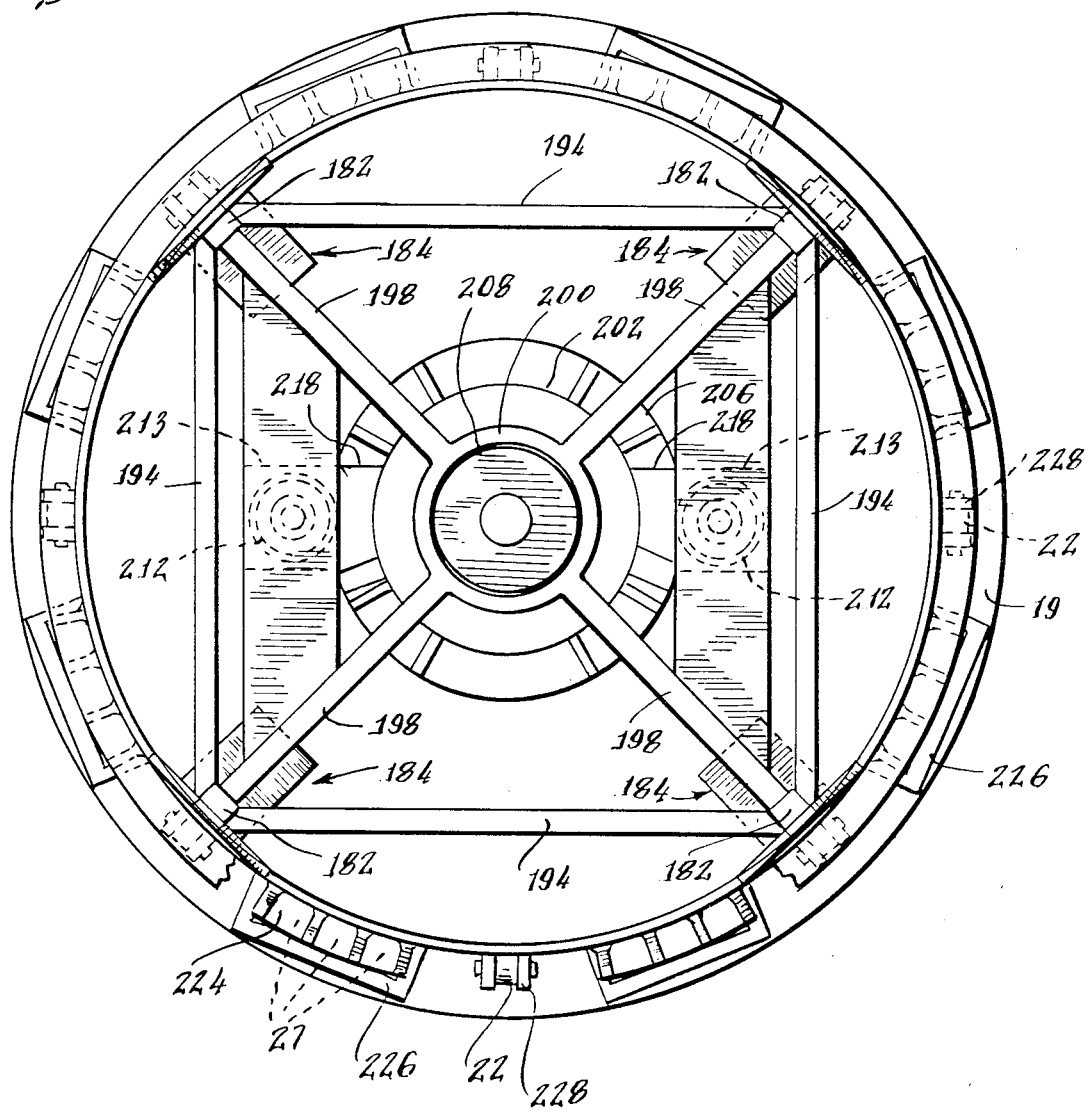
FIG. 9 is a top plan view of the land source of FIG. 8.
Figure 10:
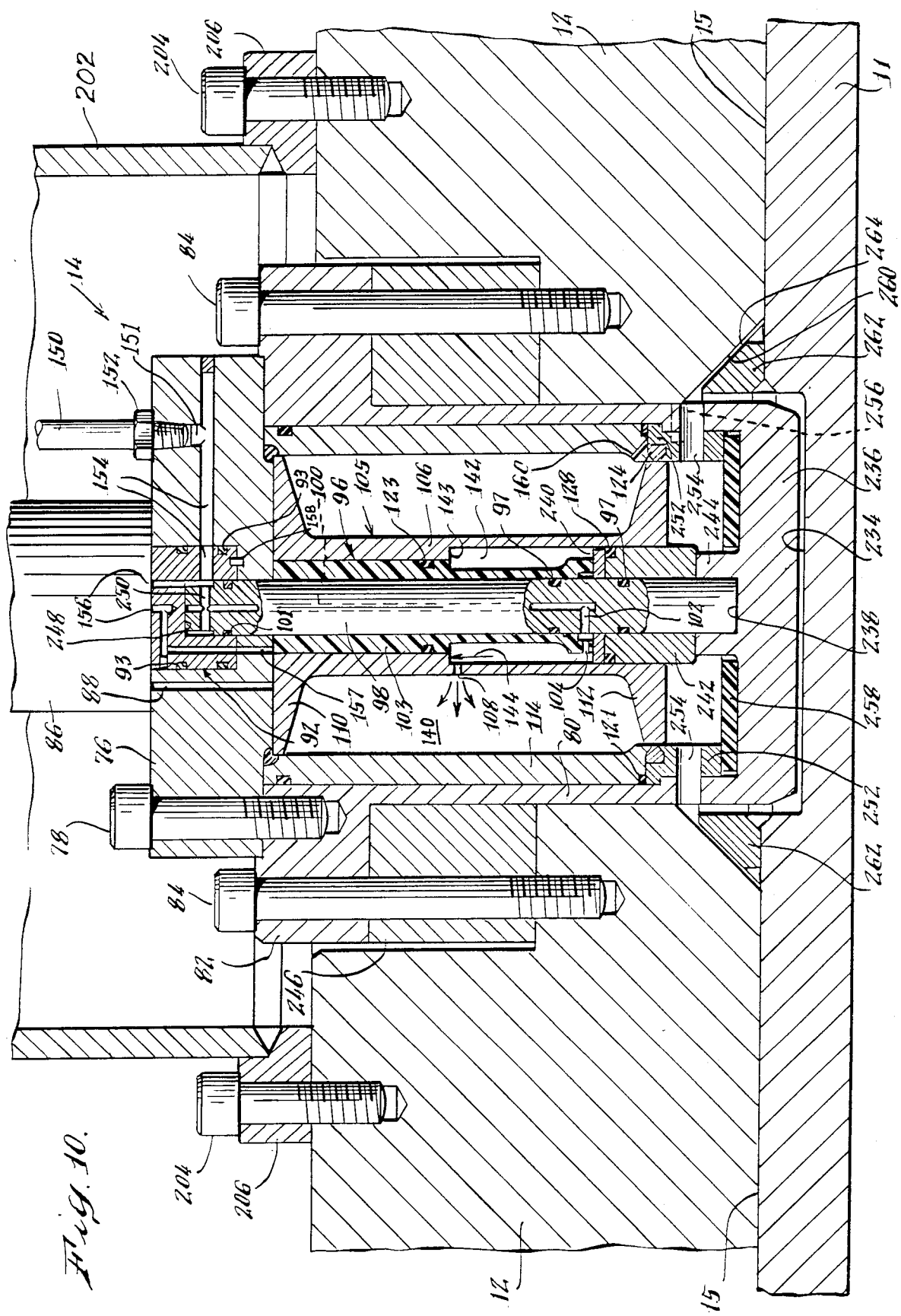
FIG. 10 is an enlarged axial-sectional view of another embodiment of an air gun, which is my presently preferred air gun for use in the land source apparatus shown in FIGS. 8 through 15.

FIG. 7 is a plan view showing six of the land seismic sources 10 mounted beneath a large rectangular platform 165A which can be raised and lowered by a plurality of hydraulic cylinder and piston assemblies 26. In other words, the large platform 165A in FIG. 7 is arranged similarly to the platform 165 shown in FIG. 6, except that six of the land sources 10 are mounted beneath it. The platform 165A is adapted to be positioned beneath the chassis of a land vehicle with the cylinder and piston assemblies 26 being used to raise and lower the platform 165A with respect to the vehicle chassis. By virtue of the fact that the firing repetition rate of each of the seismic sources 10 is relatively rapid, the various individual sources 10 in the array shown in FIG. 7 can be fired simultaneously or in a predetermined sequence which may be rapidly repeated for transmitting various seismic signals from this array of sources 10.

Thus, a very compact and effective mobile land. seismic source 10 is provided in accordance with the present invention which can advantageously be employed for making seismic surveys on a wide variety of terrain and under moderate as well as extreme climatic conditions and can be used in arrays on a single vehicle. Since confined water is not required, this system may be employed in arrid regions without having to transport large quantities of water to the survey site. Furthermore, the source can be used in frigid regions without having to take steps to prevent freezing. It provides a relatively rapid firing repetition rate as described above.

Inviting attention to FIGS. 8 through 13, there is shown a land seismic source 10A in which components that have functions corresponding to those in the source 10 are indicated by corresponding reference numbers. The source 10A is shown mounted in a cage-like frame 180 similar to the frame shown in Pat. No. 4,108,271. Thus, any user who has a vehicle-mounted confined-liquid seismic land source, as shown in said patent, can, if desired, instal the present source on a retrofit basis. This seismic source 10A can also be mounted on a vehicle in other advantageous arrangements, for example, as shown in FIGS. 14 and 15 to be described later.

The frame 180 includes a plurality of spaced parallel upright guide rails 182, for example, four rails, for guiding respective slider shoe assemblies 184 (FIG. 11) which can slide freely up and down along the rails 182. Each slider shoe assembly 184 is generally U-shaped as seen looking down along a rail 182 and is lined with a bearing material 186 for slidingly engaging three sides of the square cross section rail, for example, of ultra high molecular weight polyethylene or other tough durable slippery plastic material. The slide shoe assemblies 184 are secured to the reaction mass 12 by welding.

The lower ends of the rails 182 are secured to and braced by a cylindrical member 188 (FIG. 12) and are stiffened by gussets 190 (FIG. 8) welded to the top of the cylindrical member 188. The intermediate portions of the rails 182 are secured to and braced by other gussets 190 (FIG. 8) and transverse struts 192. The upper portions of the rails are secured by transverse top struts 194 (FIGS. 8 and 9), and by inclined braces 196 (FIG. 8) and by diagonal braces 198 (FIG. 9) whose inner ends are welded to a top guide ring 200 and also welded to the inclined braces 196.

The reaction mass 12 of the seismic energy source 10A is mounted to the lower end of an upright cylindrical casing 202 (FIG. 8), for example, by means of machine screws 204 (FIGS. 10–13) passing through a flange 206 on this cylindrical casing. The upper end of this upright cylindrical casing 202 is welded rigidly to a smaller diameter upright cylindrical casing 208 which extends up through the top guide ring 200 in freely sliding relationship with this top guide ring.

In order to lower the reaction mass 12 down relatively slowly after the reaction mass has travelled upwardly, as shown by the arrows 210 (FIG. 13) after the air gun 14 has been fired, there are a plurality of hydraulic catch cylinders 212 (FIG. 8) having check valve means associated therewith which prevent the mass 12 from slamming back down against the ground plate 11 and serve to lower this mass smoothly and relatively slowly back down onto the ground plate 11. Two of these hydraulic cylinders 212 are shown, each having its upper end connected to a mount 213 secured to the top of the cage frame 180. A piston rod 214 extends down from each cylinder, and the lower end of the piston rod is secured by a self-aligning connection 216 (FIGS. 11 and 12) to a bracket 218 welded onto the upright cylindrical casing 202.

In order to provide access to the air gun 14, there is an access opening 220 (FIG. 8) provided in the side of the upright cylindrical casing 202 near the reaction mass 12. The electrical cable 222 to the solenoid firing valve 86 and the high pressure hose line 150 extend through this access opening.

The weight of the cage frame 180, which may be augmented by the weight of the land vehicle that transports this land seismic energy source, pre-loads the ground plate 11 down against the ground 18. The frame 180 presses down through a plurality of resilient bumpers 27 mounted on brackets 224 (FIG. 8) attached to the cylindrical brace member 188. These bumpers 27 press down upon ledge members 226 secured to a large diameter horizontal ring member 19 (FIGS. 11-13) as by bolts 20 to a flange 21 on the top of the guide cylinder 16. This guide cylinder 16 is welded to the perimeter of the circular ground plate 11.

For supporting the ground plate 11 and its guide cylinder 16, there are a plurality of strong tough straps 22 as described above having anchoring pins at each end anchored in upper brackets 228 and lower brackets 230. These upper brackets 228 are secured to the cylindrical brace member 188 near an upper stiffening flange 232. These lower brackets are secured to the flange ring 19.

These straps 22 are slack when the ground plate 11 is seated firmly onto the ground 18. They support the plate 11 and its guide cylinder 16 when the cage frame 180 is elevated by the vehicle for travel to the next site.

The air gun 14 (FIG. 10) is generally similar to the air gun shown in FIG. 5. The differences will now be described. The cylindrical casing 80 extends down below the bottom surface of the reaction mass 12, its lower end being received in a clearance recess 234 in the upper surface of the ground plate 11. The lower end of the casing 80 is closed by an end wall 236 having a socket 238 for receiving the lower end of the shank member 98 of the pedestal assembly 96. This pedestal assembly 96 extends axially completely through the axial bore in the shuttle 105. A bearing sleeve or shaft gland 103 of tough durable slippery material, such as Delrin, surrounds the shank 98 being captured by a washer 240 resting on a retainer 242 seated on the upstanding rim 244 of the socket 238.

The flange 82 of the casing 80 rests upon a spacer 246. The upper end of the shank 98 is captured in a socket 248 in the assembly 92 which includes the fill passage 154 and the trigger passages 156 and 157. A transverse passage 250 in the upper end of the shank 98 provides communication from the fill passage 154 to the axial fill passage 100 in the shank 98.

The upper piston 110 is slightly larger in diameter than the lower piston 112 and engages the seal ring 115 in its initial position. The periphery of the lower piston 112 slidingly engages a peripheral seal 124 which is held by a cylinder liner sleeve 114 and a retainer sleeve 252. This retainer 252 contains a plurality of radial discharge ports 254, for example, four or six, communicating with aligned discharge ports in the casing 80 near the lower end wall 236. An alignment pin 256 holds the sleeve ports in register with the casing ports.

A resilient bumper pad 258 of tough durable resilient material, such as polyurethane, is supported by the end wall 236 for stopping the shuttle after the air gun has fired. This pad 258 is captured by the retainer 252.

For directing the discharged compressed air downwardly from the ports 254 into the interface region 15 there is a downwardly and outwardly sloping surface 260 on the reaction mass 12. A fillet 262 welded to the plate 11 around the recess 234 has a sloping surface 264 in close proximity to the surface 260, for minimizing the volume into which the compressed air is discharged.

The upper surface of the plate 11 in this embodiment as shown is four feet in diameter, and this plate has a thickness, for example, of 1-9/16ths inches, being formed of tough steel. The reaction mass 12 is formed of solid steel much thicker and more massive than the plate 11. For example, this reaction mass is 3½ feet in diameter and has a thickness of eight inches.

Figure 11:
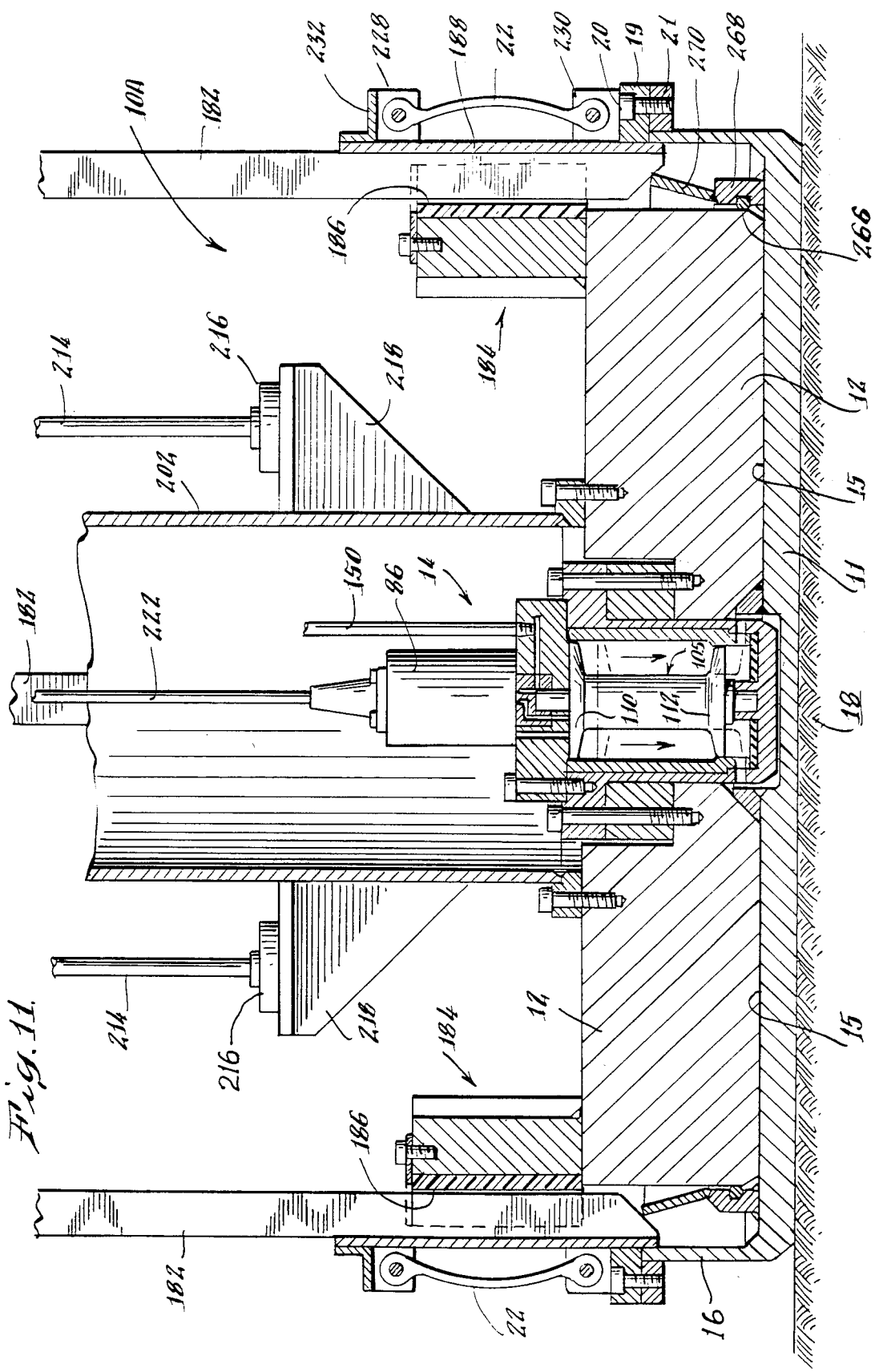
FIG. 11 is an axial-sectional view corresponding generally to FIG. 10, except that it shows the entire ground contact plate and reaction mass. The shuttle of the air gun is shown in elevation, and its firing position is indicated in dash and dotted outline.
Figure 12:
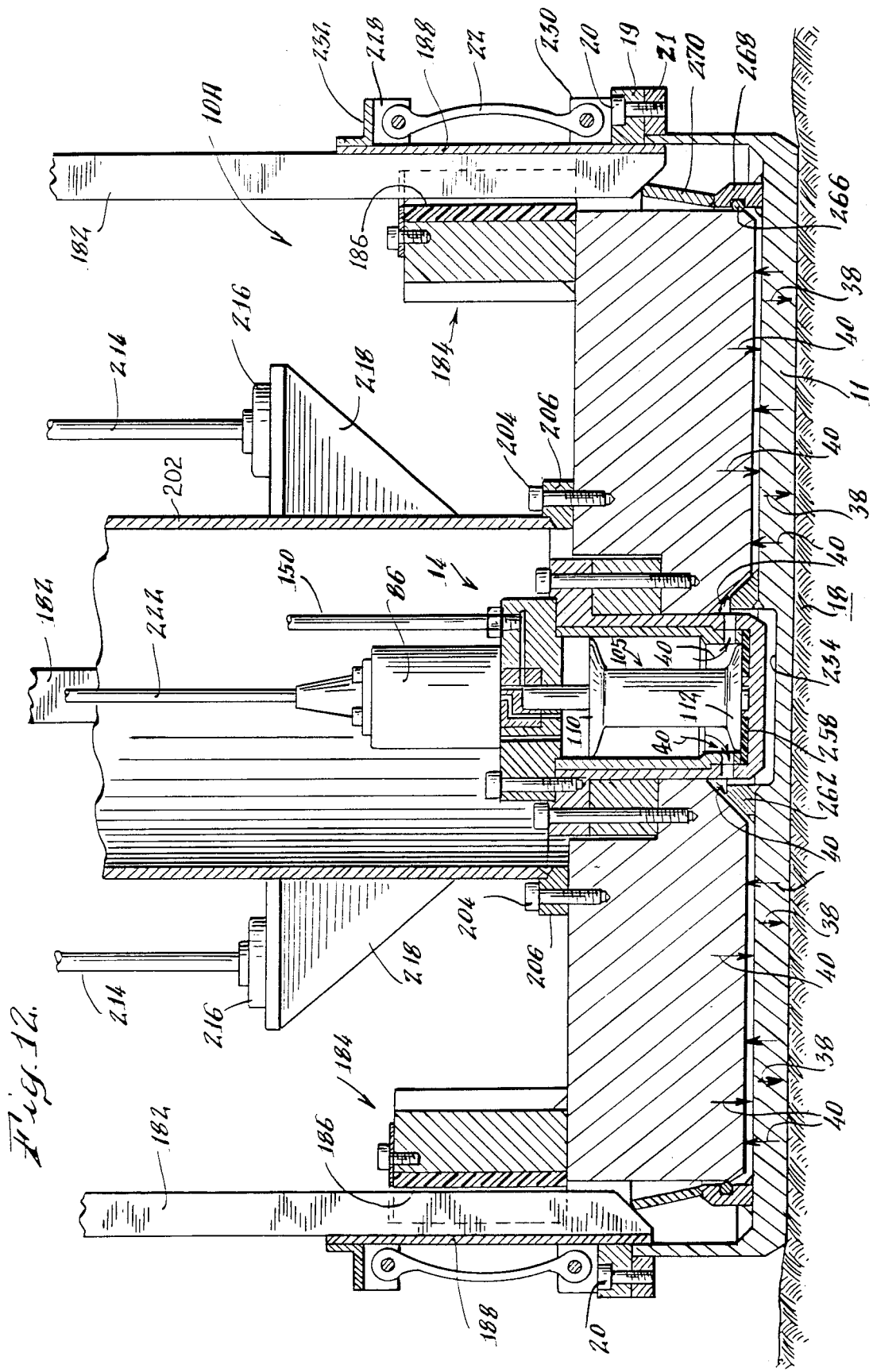
FIG. 12 is a view similar to FIG. 11 illustrating the positions of the parts immediately after firing of the land seismic source.
Figure 13:
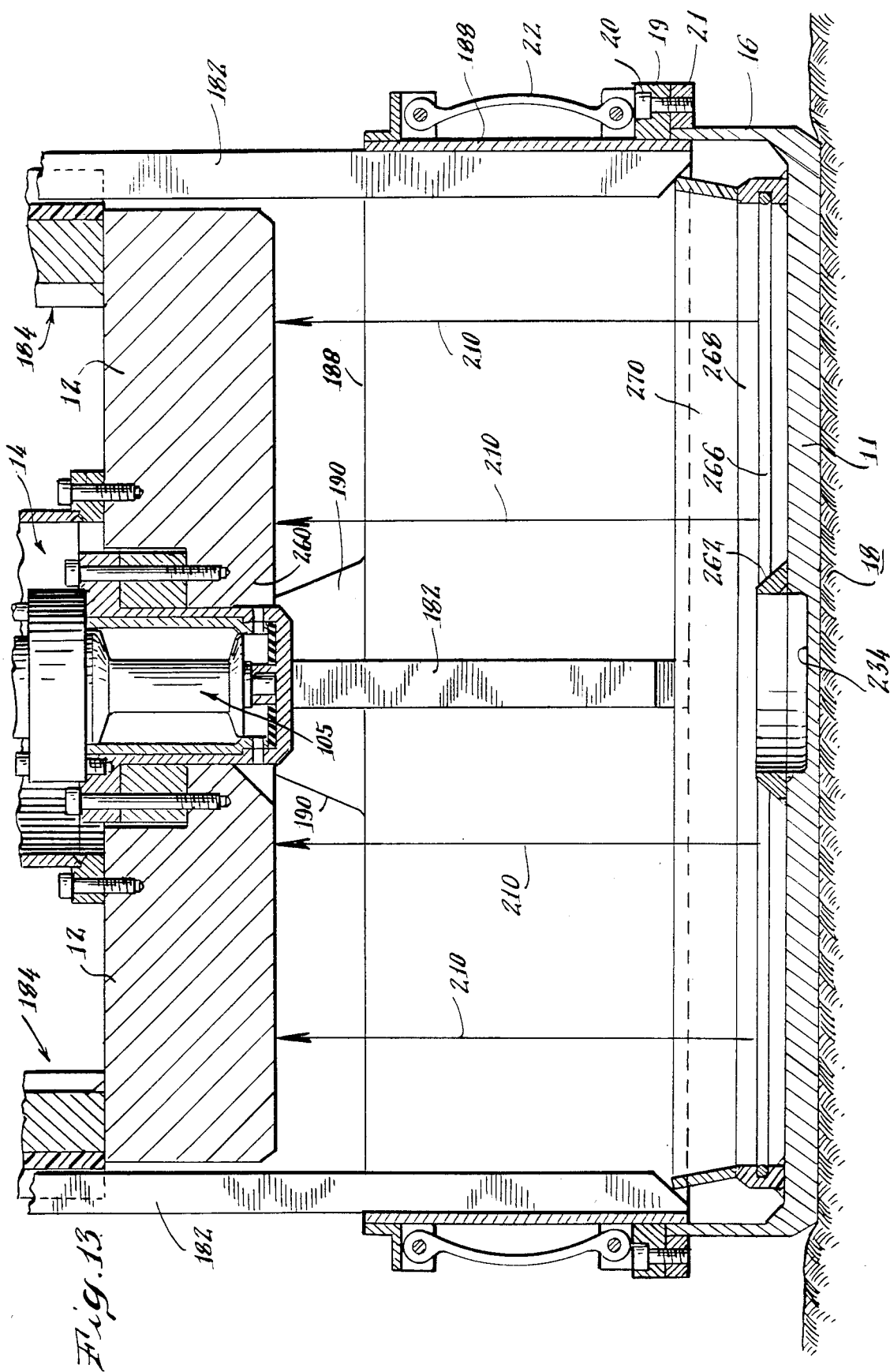
FIG. 13 is a view similar to FIGS. 11 and 12 illustrating the relative positions of the parts when they have fully moved after firing to the limits of their travel.

As shown in FIGS. 11 and 12, a peripheral seal 266 is in sliding engagement with the periphery of the reaction mass; this seal being held in a groove in a mount 268 welded to the plate 11. A conical guide 270 is welded to the mount 268 for guiding the returning mass 12 down into engagement with this seal 266.

The land seismic source 10B has a low profile configuration. The hydraulic catch cylinders 212 are mounted on an upper frame 280 attached to the vehicle chassis 17, and their piston rods 214 are connected to the top of the reaction mass 12. The shock-absorbing mounting assemblies 25 are mounted on this same frame 280. These assemblies 25 include air bags 30 and hydraulic cylinder and piston assemblies 26 with piston rods 28 each carrying a bumper 27 and a strong tough strap 22. The intermediate portion of the chassis 17 is bowed out at 282 (FIG. 14) for providing clearance for the land source 10B.

Since other modifications and changes varied to fit particular operating requirements and environments will occur to those skilled in the art, the invention is not considered limited to the examples chosen for purposes of illustration, and includes all changes and modifications which do not constitute a departure from the true spirit and scope of this invention as set forth in the appended claims.

I claim:

1. A land seismic source for transmitting powerful seismic impulses into the earth comprising:
    an air gun housed in a container means having a top and a bottom adapted to be charged with high pressure compressed air through the top of said container and discharged through the bottom of said container,
    a ground contact plate mounted below said air gun, said ground plate being intended to be positioned in intimate contact with the earth which is to receive the seismic impulse imparted thereto by said source,
    said plate having a large area upper surface, a reaction mass encircling said air gun, said reaction mass having a large area lower surface and initially being positioned with its lower surface in face-to-face contact with the upper surface of said ground plate over 90% of the upper surface of said ground plate forming an interface region therebetween, said air gun having discharge ports in the bottom of said container communicating with said interface region in which said reaction mass is initially in at least 90% contact with said ground plate, mounting means for movably mounting said ground plate relative to said reaction mass, and means for firing said air gun for discharging said high pressure compressed air radially outwardly from said discharge ports of said encircled air gun into said interface region between the lower surface of said reaction mass and the upper surface of said ground plate for separating said ground plate from said reaction mass thereby driving said ground plate downwardly for transmitting a powerful seismic impulse into the earth.

2. The land seismic source set forth in claim 1, in which said air gun comprises:

said container means having a firing chamber for holding a charge of high pressure gas, a movable shuttle in said firing chamber having an upper piston and a lower piston with a hollow cylindrical member extending between and rigidly interconnecting said pistons, said upper piston having a central opening therein communicating with the hollow interior of said cylindrical member, said upper piston having a larger diameter than said lower piston, a pedestal assembly mounted to the top of said container means, said pedestal assembly extending downwardly from the top of said container means through said opening in said upper piston and into said hollow cylindrical member, said movable shuttle being positioned on and movable axially with respect to said pedestal assembly, said pedestal assembly having passage means extending therein from the top of said pedestal assembly for conducting high pressure gas into said firing chamber, said shuttle has an axial bore extending completely through said shuttle, and said pedestal assembly extends completely through the shuttle and is mounted at its respective end to said top and bottom of said container means.

3. The land seismic source set forth in claim 2 in which:

said ground plate has a recess in its upper surface aligned with the lower end of said air gun, said recess is larger in diameter than the lower end of said air gun, and a resilient bumper pad is mounted in said recess positioned below the lower end of said shuttle.

4. The land seismic source set forth in claim 1 in which:

said ground plate has a recess in its upper surface aligned with the bottom of container means, said recess being larger in diameter than the bottom of said container means, said bottom of said container means of the air gun extends down into said recess, said air gun has a plurality of discharge ports in said container means at an elevation above the upper surface of said ground plate, and said reaction mass has a downwardly and outwardly sloping lower surface located near said ports for directing the discharged high pressure gas downwardly and outwardly into said region between the lower surface of said reaction mass and the upper surface of said ground plate.

5. The land seismic source, as claimed in claim 4, in which:

said ground plate has a fillet encircling the lower end of the air gun, and said fillet has an upper surface sloping downwardly and outwardly in close proximity to said sloping surface of said reaction mass.

* * * * *